US008196940B2

(12) United States Patent
Jeong

(10) Patent No.: US 8,196,940 B2
(45) Date of Patent: Jun. 12, 2012

(54) SUSPENSION ARM

(75) Inventor: Pil Young Jeong, Bucheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 184 days.

(21) Appl. No.: 12/827,645

(22) Filed: Jun. 30, 2010

(65) Prior Publication Data

US 2011/0133421 A1 Jun. 9, 2011

(30) Foreign Application Priority Data

Dec. 4, 2009 (KR) .................. 10-2009-0120119

(51) Int. Cl.
B62D 7/16 (2006.01)

(52) U.S. Cl. .......... 280/93.51; 280/93.511; 280/93.502; 280/124.134; 403/122

(58) Field of Classification Search .......... 280/124.134, 280/93.502, 93.51, 93.511; 403/122, 125, 403/135, 140, 130
See application file for complete search history.

(56) References Cited

U.S. PATENT DOCUMENTS

| 2,205,981 | A | * | 6/1940 | Klages | 403/129 |
|---|---|---|---|---|---|
| 2,828,969 | A | * | 4/1958 | Hoffman | 280/5.521 |
| 2,838,330 | A | * | 6/1958 | Fidler | 403/126 |
| 2,886,341 | A | * | 5/1959 | MacPherson | 280/124.134 |
| 2,924,469 | A | * | 2/1960 | Moskovitz | 403/38 |
| 2,971,770 | A | * | 2/1961 | Wagner | 280/124.134 |
| 3,127,192 | A | * | 3/1964 | Traugot et al. | 280/86.756 |
| 3,135,540 | A | * | 6/1964 | Herbenar | 403/124 |
| 3,257,133 | A | * | 6/1966 | Wight | 403/40 |
| 3,282,602 | A | * | 11/1966 | Willingshofer et al. | 280/124.134 |
| 3,337,246 | A | * | 8/1967 | Moskovitz | 403/133 |
| 3,521,900 | A | * | 7/1970 | Yasuyuki | 280/124.134 |
| 3,988,818 | A | * | 11/1976 | Allison | 29/898.051 |
| 3,999,872 | A | * | 12/1976 | Allison | 403/135 |
| 4,146,340 | A | * | 3/1979 | Smith, Jr. | 403/27 |
| 4,231,673 | A | * | 11/1980 | Satoh et al. | 403/125 |
| 4,256,413 | A | * | 3/1981 | Abe | 403/282 |
| 4,324,501 | A | * | 4/1982 | Herbenar | 403/133 |
| RE31,013 | E | * | 8/1982 | Smith, Jr. | 403/27 |
| 4,613,250 | A | * | 9/1986 | Laucus | 403/11 |
| 4,738,458 | A | * | 4/1988 | Warner | 280/86.758 |
| 4,772,044 | A | * | 9/1988 | Booher | 280/124.134 |
| 4,798,397 | A | * | 1/1989 | Komiya | 280/124.152 |
| 5,066,160 | A | * | 11/1991 | Wood | 403/140 |
| 5,752,780 | A | * | 5/1998 | Dorr | 403/135 |
| 5,765,844 | A | * | 6/1998 | Wood | 280/93.509 |
| 5,794,965 | A | * | 8/1998 | Stuker et al. | 280/124.169 |
| 5,931,597 | A | * | 8/1999 | Urbach | 403/134 |

(Continued)

FOREIGN PATENT DOCUMENTS

JP 58-146714 A 9/1983

(Continued)

Primary Examiner — Paul N Dickson
Assistant Examiner — Nicole Verley
(74) Attorney, Agent, or Firm — Morgan, Lewis & Bockius LLP

(57) ABSTRACT

A suspension arm may include a metal ball housing, a metal bushing housing, a metal connecting portion including a ball housing annulus at an end portion thereof, wherein the metal ball housing is inserted and mounted in the ball housing annulus, and wherein the other end portion of the metal connecting portion is connected to the metal bushing housing, and a reinforcement member wrapping the metal ball housing, the metal bushing housing and the metal connecting portion.

9 Claims, 4 Drawing Sheets

U.S. PATENT DOCUMENTS

| | | | | |
|---|---|---|---|---|
| 6,019,383 | A * | 2/2000 | Kociba et al. | 280/124.134 |
| 6,019,541 | A * | 2/2000 | Maughan | 403/140 |
| 6,030,141 | A * | 2/2000 | Lieber et al. | 403/135 |
| 6,109,816 | A * | 8/2000 | Iwasaki | 403/135 |
| 6,164,861 | A * | 12/2000 | Maughan | 403/135 |
| 6,254,114 | B1 * | 7/2001 | Pulling et al. | 280/93.511 |
| 6,328,315 | B1 * | 12/2001 | Hebenstreit | 277/634 |
| 6,619,873 | B2 * | 9/2003 | Parker | 403/135 |
| 6,666,467 | B2 * | 12/2003 | Bernhardt | 280/93.51 |
| 6,913,273 | B2 * | 7/2005 | Drabon et al. | 280/93.502 |
| 7,073,802 | B2 * | 7/2006 | McGaughy | 280/93.51 |
| 7,083,356 | B2 * | 8/2006 | Paduano | 403/144 |
| 7,293,787 | B2 * | 11/2007 | Nunez et al. | 280/124.134 |
| 7,364,176 | B2 * | 4/2008 | Saitoh et al. | 280/124.13 |
| 7,520,691 | B2 * | 4/2009 | Dearing et al. | 403/135 |
| 7,644,500 | B2 * | 1/2010 | Schmidt et al. | 29/898.044 |
| 7,806,417 | B1 * | 10/2010 | Hanser et al. | 280/5.514 |
| 7,837,230 | B2 * | 11/2010 | Mellis et al. | 280/781 |
| 8,025,301 | B2 * | 9/2011 | Guttilla et al. | 280/124.134 |
| 8,047,739 | B2 * | 11/2011 | Sellers et al. | 403/135 |
| 2002/0074761 | A1 * | 6/2002 | Kincaid et al. | 280/124.152 |
| 2003/0122339 | A1 * | 7/2003 | Drabon et al. | 280/124.134 |
| 2004/0165940 | A1 * | 8/2004 | Fotino et al. | 403/122 |
| 2006/0151970 | A1 * | 7/2006 | Kaminski et al. | 280/124.134 |
| 2006/0193681 | A1 * | 8/2006 | Holierhoek et al. | 403/122 |
| 2006/0232038 | A1 * | 10/2006 | Weise | 280/124.134 |
| 2006/0269356 | A1 * | 11/2006 | Jordan et al. | 403/122 |
| 2008/0056811 | A1 * | 3/2008 | Urbach | 403/122 |
| 2008/0136071 | A1 * | 6/2008 | Weisbeck et al. | 267/136 |
| 2008/0240847 | A1 * | 10/2008 | Crouse | 403/122 |
| 2008/0247811 | A1 * | 10/2008 | Sellers et al. | 403/122 |
| 2009/0226244 | A1 * | 9/2009 | Byrnes et al. | 403/135 |
| 2010/0038876 | A1 * | 2/2010 | Bunker | 280/124.134 |
| 2010/0237580 | A1 * | 9/2010 | Vortmeyer et al. | 280/124.134 |
| 2011/0133425 | A1 * | 6/2011 | Jeong | 280/124.134 |
| 2011/0150563 | A1 * | 6/2011 | Kuroda | 403/122 |
| 2011/0221153 | A1 * | 9/2011 | Bladt et al. | 280/124.106 |
| 2011/0272911 | A1 * | 11/2011 | Gerhards et al. | 280/124.134 |
| 2011/0298192 | A1 * | 12/2011 | Yu et al. | 280/124.134 |

FOREIGN PATENT DOCUMENTS

| | | | |
|---|---|---|---|
| JP | 04008620 | A * | 1/1992 |
| JP | 05085120 | A * | 4/1993 |
| JP | 06055918 | A * | 3/1994 |
| JP | 09-142117 | A | 6/1997 |
| JP | 10-100628 | A | 4/1998 |
| JP | 10-109511 | A | 4/1998 |
| JP | 10-151931 | A | 6/1998 |
| JP | 11-078454 | A | 3/1999 |
| JP | 11-351235 | A | 12/1999 |
| JP | 2000-255233 | A | 9/2000 |
| JP | 2002-127936 | A | 5/2002 |
| JP | 2004-168251 | A | 6/2004 |
| JP | 2007-239846 | A | 9/2007 |
| JP | 2008-189078 | A | 8/2008 |
| KR | 2002-0062493 | A | 7/2002 |
| KR | 10-2008-0022136 | A | 3/2008 |
| KR | 10-2008-0023911 | A | 3/2008 |

* cited by examiner

SUSPENSION ARM

CROSS-REFERENCE TO RELATED APPLICATION

The present application claims priority to Korean Patent Application No. 10-2009-0120119 filed on Dec. 4, 2009, the entire contents of which is incorporated herein for all purposes by this reference.

BACKGROUND OF THE INVENTION

1. Field of the Invention

The present invention relates to a suspension system for a vehicle. More particularly, the present invention relates to a suspension arm.

2. Description of Related Art

Generally, a suspension system for a vehicle includes a chassis spring, which connects a vehicle body and an axle and relieves impacts transmitted from ground, a shock absorber, which is designed to smooth out or damp shock impulse, and dissipate kinetic energy, and a stabilizer, which relieves oscillation of a vehicle.

A suspension system may be divided into a front suspension system and a rear suspension system according to mounting position, and the front suspension system connects a frame and an axle to support a vehicle body, absorbs impact of wheels and simultaneously a parts of a steering is mounted thereof.

The front suspension system is mainly divided into a rigid axle suspension and an independent suspension, and recently the independent suspension has been primarily used for a passenger car, and the rigid axle suspension has been used for a heavy vehicle such as a bus or a truck.

The independent suspension is mainly divided into a Wish Bone type and a Strut or Mcpherson Type, and each wheel of the independent suspension is attached to the frame independently, so that a road bump affecting one wheel has no effect on the others.

A suspension system, so called a control arm, is one of main element in the suspension system and connects wheels, braking system and so on to the vehicle body.

The suspension arm requires high rigidity against vibration and lightweight so that materials for the suspension arm are changed from steel to aluminum or plastic and also the suspension arm with high rigidity and lightweight is not cost competitive.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a suspension arm with high rigidity and lightweight at a competitive price.

In an aspect of the present invention, the suspension arm may include a metal ball housing, a metal bushing housing, a metal connecting portion including a ball housing annulus at an end portion thereof, wherein the metal ball housing is inserted and mounted in the ball housing annulus, and wherein the other end portion of the metal connecting portion is connected to the metal bushing housing, and a reinforcement member wrapping the metal ball housing, the metal bushing housing and the metal connecting portion, wherein the reinforcement member is made of synthetic resin.

The circumference of the ball housing annulus may be slanted toward a center axis thereof and receives the metal ball housing such that the metal ball housing is fixedly connected to the ball housing annulus.

The metal ball housing and the ball housing annulus may be fixed at a contact portion therebetween by welding.

In another aspect of the present invention, the suspension arm may include a ball stud that is mounted to the metal ball housing therein, and a dust cover that wraps the ball stud and the reinforcement member.

In further another aspect of the present invention, the suspension arm may further include a connection reinforcement hole that is formed along the metal connecting portion and the reinforcement member is applied thereto in order for the reinforcement member to enhance coupling force.

A cross section of the metal connecting portion may be formed as an inverse "U" shape.

The reinforcement member may be integrally formed with the metal ball housing, the metal connecting portion and the metal busing housing through an insert injection molding process.

As described above, a suspension arm according to an exemplary embodiment of the present invention may have high rigidity and lightweight at a competitive price.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
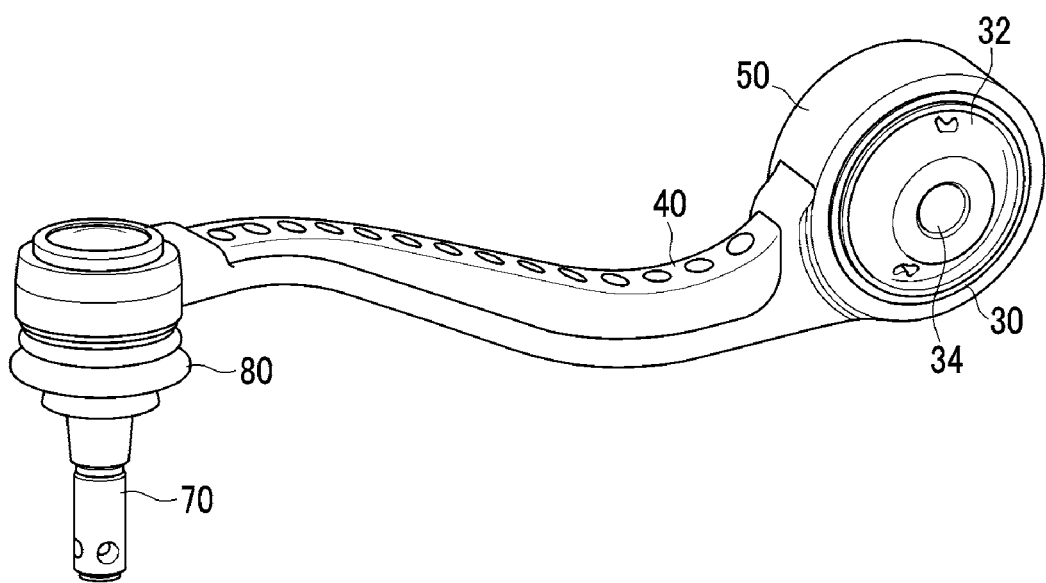
FIG. 1 is a perspective view of an exemplary suspension arm according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 2:
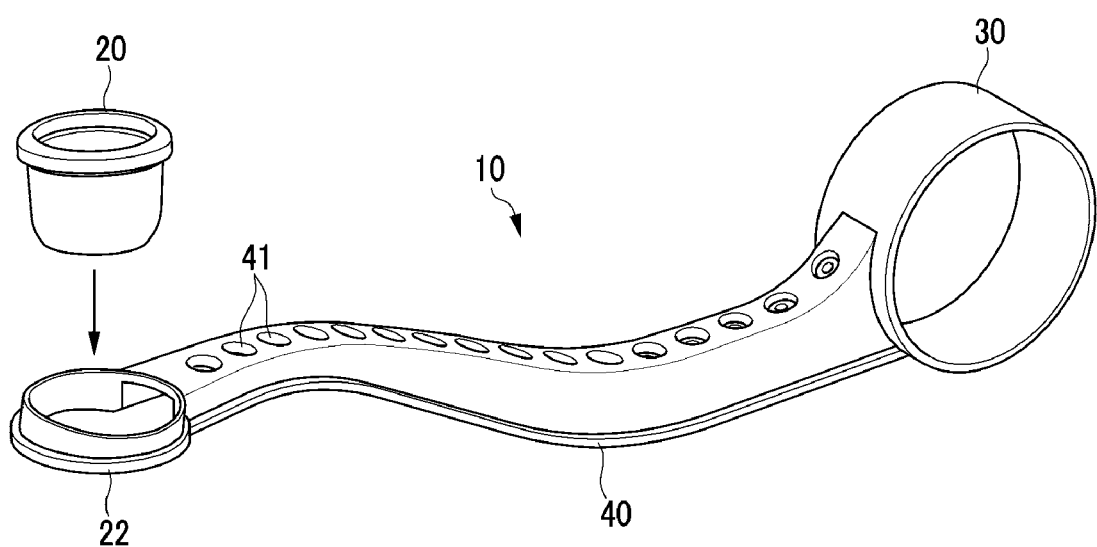
FIG. 2 is a perspective view of a metal portion of the exemplary suspension arm according to the present invention.
Figure 3:
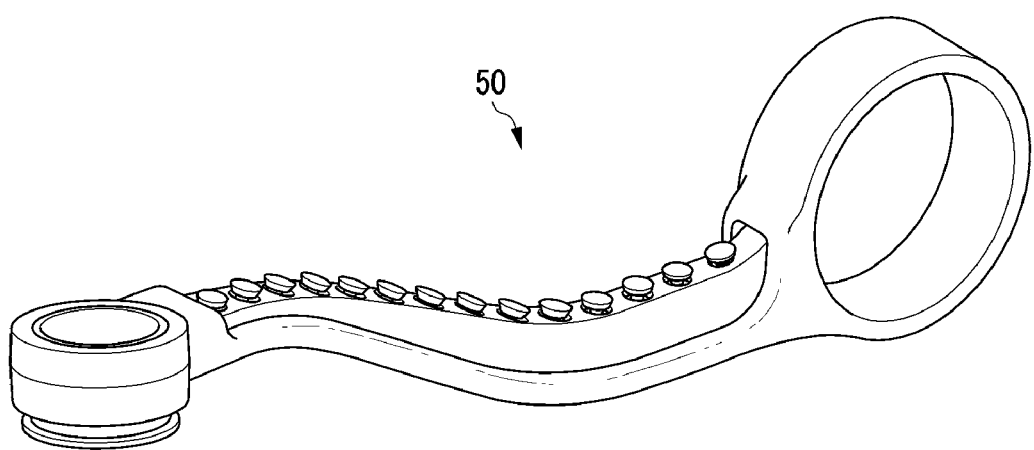
FIG. 3 is a perspective view of a reinforcement member of the exemplary suspension arm according to the present invention.
Figure 4:
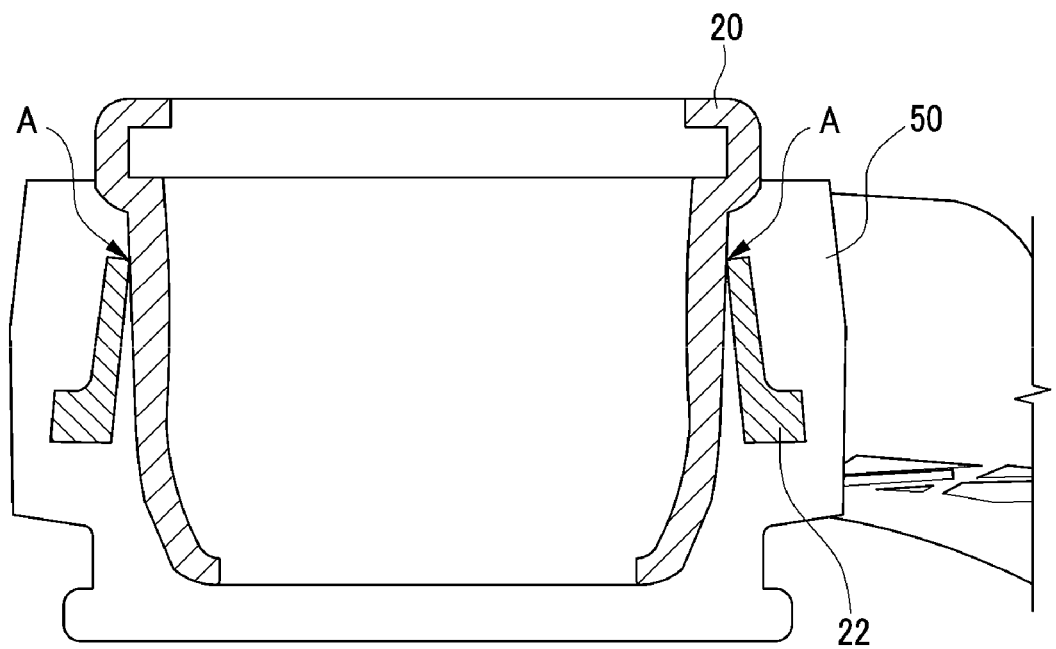
FIG. 4 is a cross-sectional view of a ball housing of the exemplary suspension arm according to the present invention.

FIG. 1 is a perspective view of a suspension arm according to an exemplary embodiment of the present invention and FIG. 2 is a perspective view of a metal portion of the suspension arm according to an exemplary embodiment of the present invention. FIG. 3 is a perspective view of a reinforcement member of the suspension arm according to an exemplary embodiment of the present invention and FIG. 4 is a cross-sectional view of a ball housing of the suspension arm according to an exemplary embodiment of the present invention.

Referring to FIG. 1 to FIG. 4, a suspension arm according to an exemplary embodiment of the present invention includes a metal ball housing 20, a metal bushing housing 30, a metal connecting portion 40 connecting the ball housing 20 and the metal bushing housing 30, and a reinforcement member 50 made of synthetic resin material wrapping the ball housing 20, the bushing housing 30 and the metal connecting portion 40. And the metal connecting portion 40 includes a ball housing annulus 22, which the metal ball housing 20 is inserted therein.

The ball housing 20, the bushing housing 30 and the metal connecting portion 40 form a metal portion 10.

A bushing 32 is disposed within the metal bushing housing 30, a bushing hole 34 is formed to the bushing 32 and a vehicle body is connected to the bushing hole 34.

A ball stud 70 is disposed to the metal ball housing 20 and a dust cover 80 wraps the ball stud 70 and the reinforcement member 50.

The ball stud 70 is connected to a wheel and the dust cover 80 protects a bearing from foreign substances.

The ball housing annulus 22 is slantingly formed for the metal ball housing 20 to be firmly connected to the ball housing annulus 22.

As shown in FIG. 4, the ball housing annulus 22 is slantingly formed against the ball housing 20, and the ball housing 20 is firmly connected to the ball housing annulus 22. And then the reinforcement member 50 is integrally formed together through an insert injection molding process and thus the reinforcement member 50 is inserted between the ball housing annulus 22 and the ball housing 20.

Also, contacting portion (A) of the metal ball housing 20 and the ball housing annulus 22 can be firmly fixed by welding before the reinforcement member 50 is integrally formed together through an insert injection molding process.

A connection reinforcement hole 41 is formed to the metal connecting portion 40 and the reinforcement member 50 can be inserted into the connection reinforcement hole 41 for enhancing coupling force A cross section of the metal connecting portion 40 is formed as inverse "U" shape so that buckling can be prevented.

The reinforcement member 50 is integrally formed so that rigidity can be enhanced.

As described above, the suspension arm according to an exemplary embodiment of the present invention is formed by the metal portion 10 made of metal material and the reinforcement member 50, made of synthetic resin material, integrally formed together with the metal portion 10 through an insert injection molding process with high rigidity and lightweight at a competitive price.

For convenience in explanation and accurate definition in the appended claims, the terms "upper" is used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A suspension arm comprising:
    a metal ball housing;
    a metal bushing housing;
    a metal connecting portion including a ball housing annulus at an end portion thereof, wherein the metal ball housing is inserted and mounted in the ball housing annulus, and wherein the other end portion of the metal connecting portion is connected to the metal bushing housing; and
    a reinforcement member wrapping the metal ball housing, the metal bushing housing and the metal connecting portion.

2. The suspension arm of claim 1, wherein the reinforcement member is made of synthetic resin.

3. The suspension arm of claim 1, wherein the circumference of the ball housing annulus is slanted toward a center axis thereof and receives the metal ball housing such that the metal ball housing is fixedly connected to the ball housing annulus.

4. The suspension arm of claim 3, wherein the metal ball housing and the ball housing annulus are fixed at a contact portion therebetween by welding.

5. The suspension arm of claim 4, further comprising:
    a ball stud that is mounted to the metal ball housing therein; and
    a dust cover that wraps the ball stud and the reinforcement member.

6. The suspension arm of claim 1, further comprising a connection reinforcement hole that is formed along the metal connecting portion and the reinforcement member is applied thereto in order for the reinforcement member to enhance coupling force.

7. The suspension arm of claim 1, wherein a cross section of the metal connecting portion is formed as an inverse "U" shape.

8. The suspension arm of claim 1, wherein the reinforcement member is integrally formed.

9. The suspension arm of claim 1, wherein the reinforcement member is integrally formed with the metal ball housing, the metal connecting portion and the metal bushing housing through an insert injection molding process.

* * * * *